United States Patent

[11] 3,597,554

| [72] | Inventor | Burton L. Siegal<br>Skokie, Ill. |
|---|---|---|
| [21] | Appl. No. | 850,157 |
| [22] | Filed | Aug. 14, 1969 |
| [45] | Patented | Aug. 3, 1971 |
| [73] | Assignees | Peter C. Granata, Jr.<br>Chicago, Ill. ;<br>Edward Andrychowski, Jr.<br>Franklin Park, Ill. , part interest to each |

[54] MEMORY AND CONTROL DEVICE
6 Claims, 7 Drawing Figs.

[52] U.S. Cl. ........................ 200/52, 200/153 R, 74/104, 318/466
[51] Int. Cl. ........................ H01h 3/32
[50] Field of Search ........................ 74/99, 104, 107, 568 M, 102, 105, 106; 200/52, 153, 153 S; 318/466

[56] References Cited
UNITED STATES PATENTS

| 2,586,478 | 2/1952 | Paxhia | 74/107 |
| 3,104,592 | 9/1963 | Sheesley | 74/104 X |
| 3,472,978 | 10/1969 | Granata, Jr. et al. | 200/52 |

Primary Examiner—Robert K. Schaefer
Assistant Examiner—Robert A. Vanderhye
Attorney—Hill, Sherman, Meroni, Gross and Simpson ABSTRACT: The memory and control device comprises means for positioning a power seat to preset positions and selectively repositioning it to such preset positions and also providing manual control of the seat to place the seat in any position. The present system utilizes a different motor for each of the directions of actuation for the seat and provides mechanical means for establishing the preset positions.

INVENTOR.
BURTON L. SIEGAL

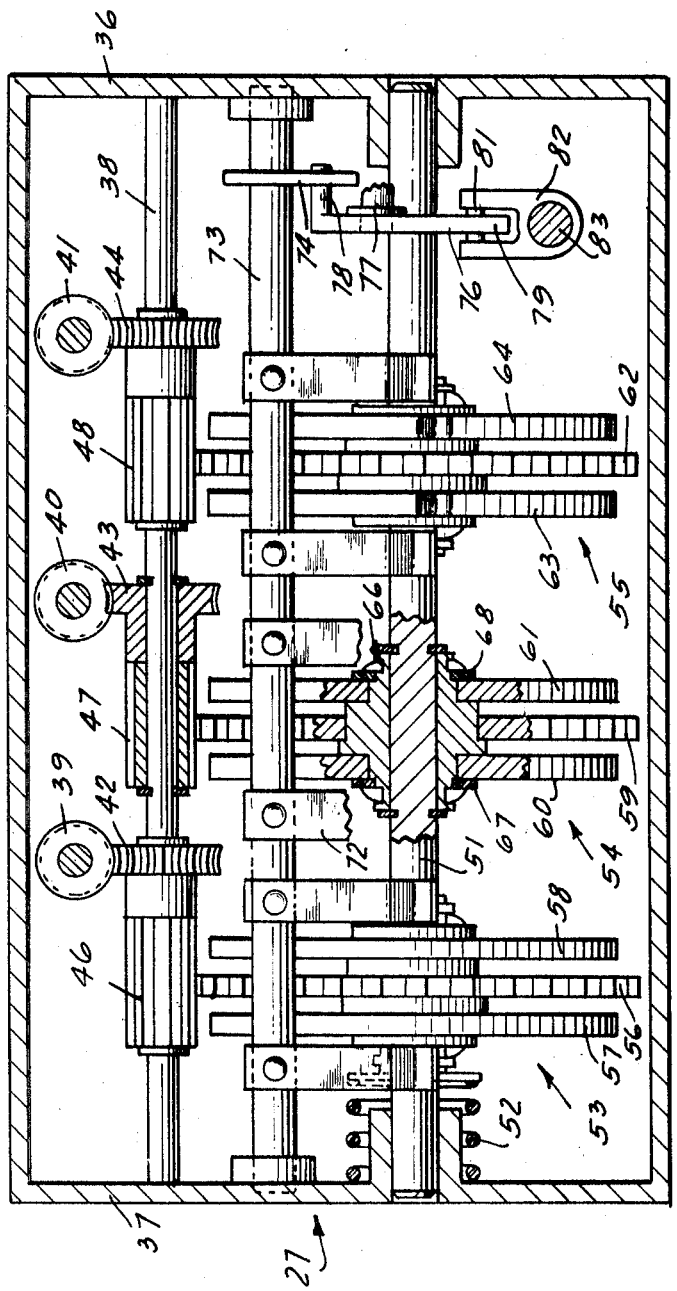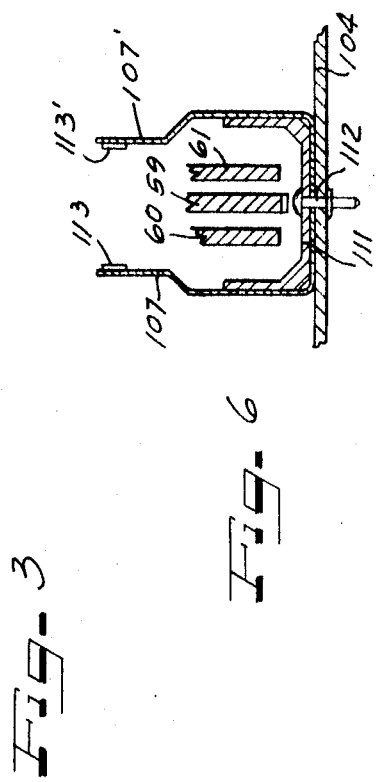

INVENTOR.
BURTON L. SIEGAL 3,597,554

MEMORY AND CONTROL DEVICE

CROSS REFERENCES TO RELATED APPLICATIONS

This application is related to the application entitled "Memory and Control Device," Ser. No. 709,365, filed Feb. 29, 1968, by Peter C. Granata, Jr., Burton L. Siegal and Edward J. Zeissler, now U.S. Pat. No. 3,472,978, issued Oct. 14, 1969.

BACKGROUND OF THE INVENTION

1. Field of the Invention

This invention relates, in general, to automatic positioning devices and in particular to means for automatically positioning a seat to predetermined positions.

2. Description of the Prior Art

The positioning of six-way power seats has previously been accomplished manually by adjusting the position of three control motors to a selected position. Since automobiles are often used by more than one person, it is desirable to have a memory control system which automatically positions a seat to the preferred setting of the different drivers.

SUMMARY OF THE INVENTION

The present invention includes an electromechanical memory positioning system which can be preset to any desired position and thereafter position the device that is controlled to the desired position. Three control motors may be connected to position a seat and the electromechanical memory positioning device of this invention provides at least two preselected positions which may be selected by the operator. The motors provide a position feedback input to the control unit of the invention by supplying flexible shaft positions to the motor control switches and the motors are caused to operate in either direction by applying signals of different polarity to the motors for this purpose. The control switches for the motors are provided with contoured conductive surfaces which may be rotationally positioned for obtaining the selected preset position. A plurality of contact fingers are mounted so as to selectively engage the contoured conductive surfaces of the selector switches and provide the electrical current path through the motor until the selected position has been reached.

Other objects, features and advantages of the invention will be readily apparent from the following description of preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 3 is a sectional view of the control memory unit of the invention;

FIG. 6 is a detailed sectional view of the switch.

DESCRIPTION OF THE PREFERRED EMBODIMENTS

Figure 1:
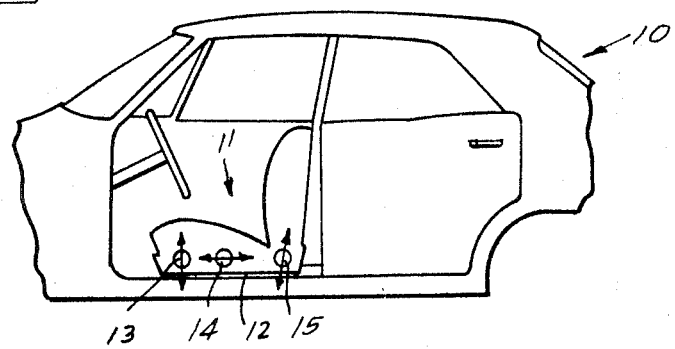
FIG. 1 is a side elevational diagrammatic representation of an automobile with an adjustable power seat controlled by the positioning system of the invention.

FIG. 1 illustrates in partial cutaway an automobile 10 which has a power adjustable seat 11 that moves on rails 12 and has adjusting motors 13, 14 and 15. The motor 13 moves the front portion of the seat up and down, the motor 14 moves the seat backward and forward, and the motor 15 moves the rear portion of the seat up and down. Thus, by adjustment of the three motors 13, 14 and 15, the seat may be moved backward and forward and tilted and raised and lowered.

Figure 2:
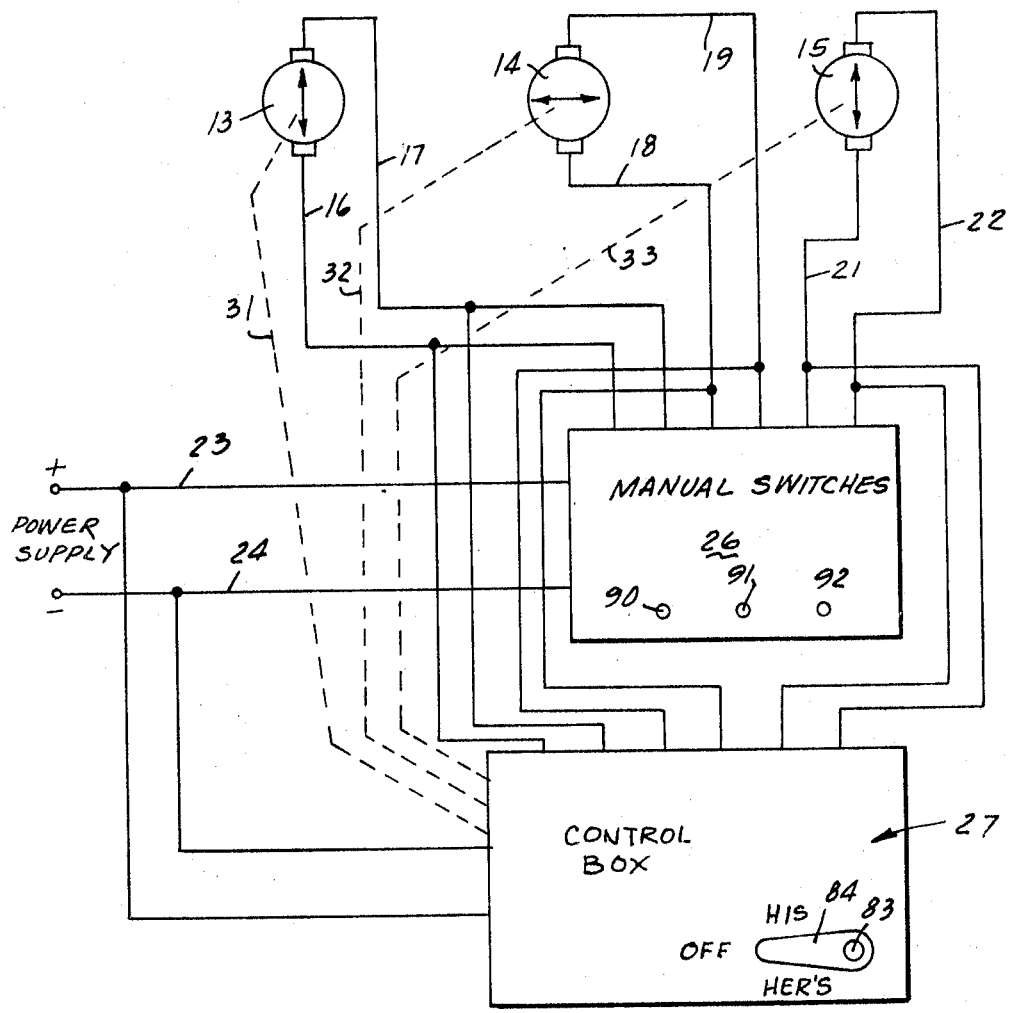
FIG. 2 is a schematic view illustrating the control system of the invention.

FIG. 2 illustrates the motors 13, 14 and 15 with their control system. The motor 13 has energizing leads 16 and 17 which are connected to the control box of this invention 27 and to manual switches 26. Motor 14 has control leads 18 and 19 which are connected to the control box 27 and the manual switches 26. Motor 15 has control leads 21 and 22 which are connected to the control box 27 and the manual switches 26.

The manual switches 26 include three switches 90, 91 and 92 for selectively applying power of either polarity to the motors 13 and 14 and 15. The manual switches 26 receive power from power leads 23 and 24 of the vehicle. The control box 27 also receives input power from the leads 23 and 24. The motors 13, 14 and 15 have output shafts 31, 32 and 33, respectively, which supply inputs to the control box 27 to control the followup system of the memory device of this invention.

FIGS. 3, 4, 5 and 6 disclose in detail the memory system of this invention which is contained in the control box 27.

Figure 4:
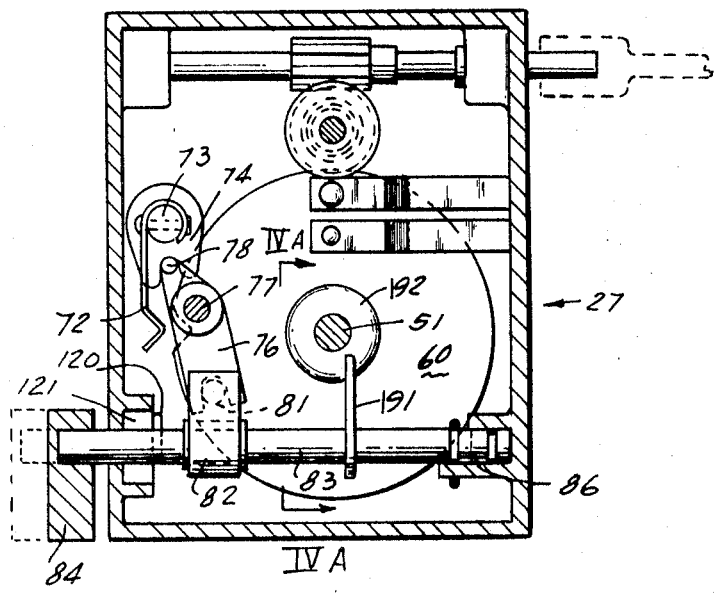
FIG. 4 an end view of the mechanical control unit of the invention.
Figure 5:
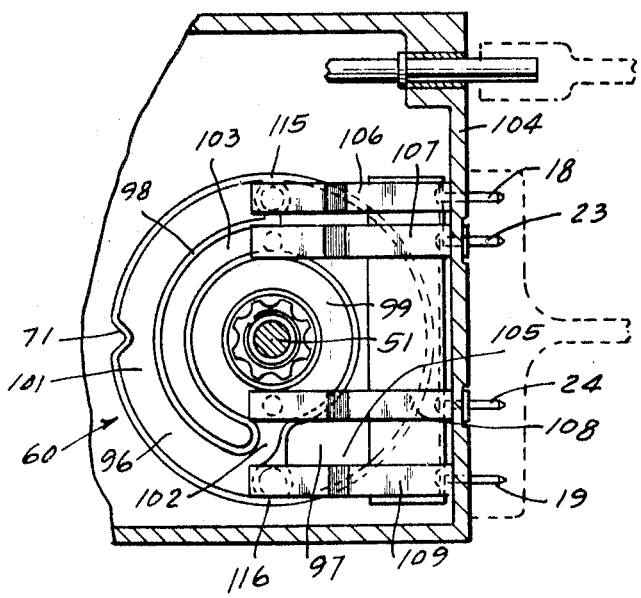
FIG. 5 is an end view illustrating details of one of the control switches.

As shown in FIGS. 3, 4 and 5, the control box 27 is formed with end walls 36 and 37 which support a first shaft 38 that rotatably supports gears 42, 43 and 44 which mesh with gears 39, 40 and 41 that are driven by the flexible shafts 31, 32 and 33, respectively, of the motors 13, 14 and 15. The gears 42, 43 and 44 are attached to gears 46, 47 and 48 which drive His and Her switch control units 53, 54 and 55, respectively. The unit 54, by way of example, comprises a driven gear 59 which meshes with the gear 47 and is nonrotatably supported on a hub 66 which is rotatably supported on shaft 51 between the end walls 36 and 37 and may be held by snaprings. The shaft 51 is also supported in suitable bearings for longitudinal motion to the right and left and is spring-biased by spring means 52 to return it to the center "off" position. The gears 46, 47 and 48 are rotatably mounted on the shaft 38 and thus each of the flexible shafts 31, 32 and 33 may independently adjust their respective driven gears 56, 59 and 62 of the switch units 53, 54 and 55. A pair of contoured switch discs 60 and 61 are mounted on the hub 66 on opposite sides of the driven gear 59 and are held by friction washers 67 and 68 to the hub. As best shown in FIG. 5, the contoured switch discs 60 and 61 are formed with notches as, for example, the notch 71 which is formed in disc 60 to allow a locking pawl 72 to hold the contoured disc plate to obtain a desired setting.

Figure 4A:
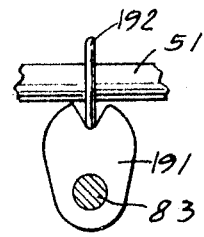
FIG. 4A is a detail view.

It is to be realized that there is a detent pawl 72 for each of the contoured switch discs 57, 58, 60, 61, 63 and 64 but for illustrative purposes only the pawl 72 is illustrated in FIG. 4. The pawl 72 is mounted on a supporting shaft 73 and has an actuator cam 74 formed with a slot in which a pin 78 is received. A pawl 76 is supported on a shaft 77 which is supported by a supporting bracket (not shown) from the housing of the control unit and carries the pin 78 which engages the notch of member 74. The pawl 76 has a lower portion 79 which engages a pin 81 that is mounted on a bracket 82 which is carried on the control shaft 83. The control shaft 83 may be moved longitudinally relative to the control box 27 and has a detent 86 to hold it in its in or out position. The knob 84 which is carried on the shaft 83 may be pulled to a setting position which moves the pin 81 of the bracket 82 into engagement with the pawl 76 thus positioning the locking pawl 72 in the notch 71 of the disc 60 to thus hold it to allow a new position of the contour switch to be obtained. As shown in FIGS. 4 and 4A, the shaft 83 also carries a bracket 191 which engages a disc 192 on shaft 51 to move the shaft 51 transversely of the control box 27. If the actuator lever 84 is moved upwardly to the "His" position, the bracket 91 moves the disc and shaft 51 to the right relative to FIG. 3 such that the switch contacts associated with the contoured discs 58, 61 and 64 engage the surfaces to control the unit. Alternatively, if the actuator lever 84 is moved downwardly to the "Her" position relative to FIG. 3, the linkage comprising the unit 191 and disc 192 moves the shaft 51 to the left relative to FIG. 3 so that the associated switch contacts contact the contour surfaces 57, 60 and 63. A pin 120 is attached to shaft 83 and is receivable into a slot 121 only when knob 84 is in the "His" or "Her" positions to allow shaft 83 to be moved to the left.

Each of the contoured discs 57, 58, 60, 61, 63 and 64 are similar to disc 60 which is shown in plan view in FIG. 5. The disc 60, by way of example, has two conductive areas 96 and 97 which are insulated from each other by insulating area 98. The area 96 has a first circular portion 99 which is joined to a crescent-shaped portion 101 adjacent the periphery by transition portion 102. The crescent portion 101 extends less than 180° about the disc. The conductive portion 97 has a conductive crescent-shaped portion 105 at the outer portion of the disc and an inner crescent-shaped portion 103 which is connected electrically to the portion 105. Switch contacts are mounted on the end wall 104 of control box 27 and support four U-shaped switch contacts 106, 107, 108 and 109 as shown in greater detail in FIG. 6, wherein one of the switch contacts 107 is illustrated. As seen in FIG. 6 the switch contact 107 is formed into a U-shaped portion by having a second leg 107' and a center portion 111 that is connected to the end wall 104 by suitable insulated contractors 112. Portion 111 is nonconductive and serves to limit the inward motion of the spring contacts 107 and 107'. Engaging contacts 113 and 113' are formed on the ends of legs 107 and 107' so as to engage the conductive surfaces on the discs 60 and 61 when they are moved into position with their related switch. The power feeding conductors 23 and 24 are connected to the contacts 107 and 108 which apply power to the portions 96 and 97. Motor drive contacts 106 and 109 would be connected to leads 18 and 19, respectively, of motor 14 and the associated contacts of units 53 and 55 would be connected to the motor drive leads of the motors 13 and 15, respectively.

Between the conductive areas 96 and 97 which the contacts 106 and 109 engage are insulated "home" portions 115 and 116, respectively. For example, FIG. 5 illustrates the contacts 106 and 109 in the home position so that power is not applied between the contact 107 and contact 106 or contacts 109 and 108. Thus, the motor 14 will not operate in this position and the motor is in its home position.

Thus, the invention provides means for moving the switch contact discs 57, 58, 60, 61, 63 and 64 to any predetermined concepts which will be remembered so that the control unit will position the motors 13, 14 and 15 to the preset position. When the actuator lever 84 is moved to the "Her" position the shaft 51 will be moved to the left relative to FIG. 3 engaging the contoured discs 57, 60 and 63 with contacts similar to contact 107 which engages the disc 60 as shown in FIG. 6 and if the motors 13, 14 and 15 are not in the home position wherein the corresponding contacts such as contacts 106 and 109 engage the portions 115 and 116 which are insulated from each other and from power, the motor will commence to run in a direction determined by the polarity of the portion of the contour surface which the contacts 106 and 109, respectively, engage. The motor then will run in a direction to move the disc such as 60 to its home position illustrated in FIG. 5 at which time power will be disconnected from the motor and the motor will stop. It is to be realized, of course, that the feedback shafts 31, 32 and 33 position the discs as the motors position the seat to its desired preset position.

When a different person uses the automobile and wishes to change the seat position to a different preset position the lever 84 may be moved upwardly relative to FIG. 3 to the "His" position thus moving the shaft 51 to the right relative to FIG. 3 and causing the discs 58, 61 and 64 to engage the associated switch contacts which will again energize the drive motors, 13, 14 and 15 until the discs are in the insulated home position as shown in FIG. 5 at which times the motor will stop and the seat will be correctly positioned.

To change a preset position of the seat, the lever 84 is placed in the His or Her position and is pulled outwardly as shown in FIG. 4 to engage the locking pawl 72 in the notch 71 of the associated contoured switch plate and the seat is then manually energized by the manual switches 90, 91 and 92 to the desired preset position. The pawl 71 holds the associated disc 60 and allows it to slip relative to the hub such as the hub 66 on shaft 51 as the gear 59 is rotated. When the desired position is obtained the lever 84 is pushed in to move the shaft 83 to the right relative to FIG. 4 thus disengaging the locking pawl 72 from the notch 71 and the new position is preset into the unit.

It is seen that this invention provides means for simply setting motors such as motors for controlling the position of a seat to any one of a plurality of positions and provides a simple mechanical control lever for moving the switch control shaft transversely to engage switch contacts and also provides means for setting the switch contact plates by merely moving the control shaft outwardly to engage locking pawls while the new position is established.

It will be understood that modifications and variations may be effected without departing from the spirit and scope of the novel concepts of the present invention.

I claim:

1. An electromechanical memory positioning system comprising: an electrically energizable drive means mechanically connectable to a positionable device to move the device to a predetermined desired position when the device is displaced therefrom; a movable member mechanically connected to said drive means for movement in response to the movement of the positionable device; a contoured electrically conductive surface formed on said movable member, said contoured surface being contoured to form at least one area of nonconductance thereon; switch means positioned adjacent said conductive surface, said switch means having contact points engageable with said conductive surface and electrically connectable to said drive means; a selector switch for connection to a power source and connectable to said switch means for energizing said drive means through said switch means and said conductive surface when said positionable device is displaced from said desired position; thereby, moving said positionable device and said movable member until at least one of said contact points of said switch means engages the nonconductive area of said conductive surface thereby deenergizing said drive means and stopping said positionable device at said desired position, said movable member is a driven disc mounted for rotation about its axis, and said conductive surface is on one side of the disc, a second contoured electrically conductive surface mounted on the other side of said disc and further including second switch means for controlling the energization of said drive means in a second direction, said contoured conductive surfaces are formed from metal plates and frictionably movably secured to the sides of said disc, further including setting means for moving the metal plates relative to said disc for changing the predetermined desired position of said movable device, said setting means includes a notch formed in said metal plate, a lever selectively engageable with said notch to hold said plate in a fixed position while said disc is rotated relative thereto, mechanical actuating means for moving said lever into engagement with said notch, a rotatable shaft supporting said lever, a link attached to said rotatable shaft, and a pawl rotatably supported with one end engageable with the link and means for moving said pawl.

2. An electromechanical memory positioning system comprising: an electrically energizable drive means mechanically connectable to a positionable device to move the device to a predetermined desired position when the device is displaced therefrom; a movable member mechanically connected to said drive means for movement in response to the movement of the positionable device; a contoured electrically conductive surface formed on said movable member, said contoured surface being contoured to form at least one area of nonconductance thereon; switch means positioned adjacent said conductive surface, said switch means having contact points engageable with said conductive surface and electrically connectable to said drive means; a selector switch for connection to a power source and connectable to said switch means for energizing said drive means through said switch means and said conductive surface when said positionable device is displaced from said desired position; thereby moving said positionable device and said movable member until at least one of said contact points of said switch means engages the nonconductive area of said conductive surface thereby deenergizing said drive means and stopping said positionable device at said desired position, said movable member is a driven disc mounted for rotation about its axis, and said conductive surface is on one side of the disc, a second contoured electrically conductive surface mounted on the other side of said disc and further including second switch means for controlling the energization of said drive means in a second direction, means for laterally shifting said disc so as to cause the metal plates secured to the sides thereof to selectively engage only one switch means at a time, said means for laterally shifting said disc comprising a transverse shaft supported for transverse motion relative to said disc, a selector lever mounted on said transverse shaft, said disc mounted on a disc shaft and mounted for movement along its axis which extends at a right angle to said transverse shaft, a shoulder attached to said disc shaft, a link attached to said transverse shaft and engageable with said shoulder to move said disc shaft along its axis, said movable member has a notch, and a locking pawl engageable with said notch and said transverse shaft coupled to said pawl to hold it in said notch when said transverse shaft is moved along its axis to a locking position.

3. An electromechanical memory positioning device according to claim 1 wherein said means for moving said pawl comprises a second rotatable shaft, a second link carried on said second shaft and said second link engageable with the pawl when said second shaft is rotated.

4. An electromechanical memory positioning device according to claim 3 comprising a selector lever attached to said second shaft.

5. An electromechanical positioning system according to claim 2 wherein said transverse shaft is coupled to said pawl by a rotatable shaft to which said pawl is attached, a second link attached to said rotatable shaft, an actuating pawl engageable with said second link, and a third link attached to said transverse shaft and connected to said actuating pawl.

6. An electromechanical positioning system according to claim 5 comprising a selector lever attached to said transverse shaft.

UNITED STATES PATENT OFFICE
CERTIFICATE OF CORRECTION

Patent No. 3,597,554   Dated August 3, 1971

Inventor(s) BURTON L. SIEGAL

It is certified that error appears in the above-identified patent and that said Letters Patent are hereby corrected as shown below:

Column 1, line 60, after "4" insert -- is --.

Column 3, line 40, change "concepts" to --position--.

Signed and sealed this 27th day of June 1972.

(SEAL)
Attest:

EDWARD M. FLETCHER, JR.  ROBERT GOTTSCHALK
Attesting Officer  Commissioner of Patents